United States Patent
Chen (10) Patent No.: US 10,637,218 B2
(45) Date of Patent: Apr. 28, 2020

(54) WIRE PULLER AND CORD

(71) Applicant: SHINKEY MONOFILAMENT ENTERPRISE CO., LTD., Changhua (TW)

(72) Inventor: Cheng-An Chen, Changhua (TW)

(73) Assignee: SHINKEY MONOFILAMENT ENTERPRISE CO., LTD., Changhua (TW)

( * ) Notice: Subject to any disclaimer, the term of this patent is extended or adjusted under 35 U.S.C. 154(b) by 369 days.

(21) Appl. No.: 15/136,995

(22) Filed: Apr. 25, 2016

(65) Prior Publication Data

US 2017/0179693 A1    Jun. 22, 2017

(30) Foreign Application Priority Data

Dec. 21, 2015   (TW) .............................. 104142942 A (51) Int. Cl.
*H02G 1/08*      (2006.01)
*D07B 7/16*      (2006.01)

(52) U.S. Cl.
CPC ............. *H02G 1/083* (2013.01); *D07B 7/169* (2015.07); *H02G 1/081* (2013.01)

(58) Field of Classification Search
CPC .......... H02G 1/081; H02G 5/007; H02G 1/00; H02G 15/00; H01L 39/024;
(Continued)

(56) References Cited

U.S. PATENT DOCUMENTS 3,161,210 A * 12/1964 Lööf ................... F16L 58/1027
                                                          138/128
4,368,910 A *  1/1983 Fidrych ..................... D07B 1/18
                                                          24/115 N
(Continued)

FOREIGN PATENT DOCUMENTS

JP    S57102599 U  *  6/1982  .............. F16G 11/03
TW       483208 A2     4/2002

OTHER PUBLICATIONS

Jackie Erickson-Schweitzer, Joining Yarn by Splitting Plies and Re-twisting, 1998. (http://www.heartstringsfiberarts.com/joining-yarn.shtm).*

(Continued)

*Primary Examiner* — Tyrone V Hall, Jr.
*Assistant Examiner* — Abbie E Quann
(74) *Attorney, Agent, or Firm* — Hauptman Ham, LLP (57) ABSTRACT

A cord and a wire puller are used to pass through narrow pipes or the like. The cord includes a first guide wire section and a second guide wire section. The first guide wire section includes a plurality of first guide wires, and the first guide wire section has a first segment in which the first guide wires are intertwisted with each other. At least a part of the first guide wires extends from the first segment to a transitional segment. The second guide wire section includes a plurality of second guide wires, and the second guide wire section has a second segment in which the second guide wires are intertwisted with each other. At least a part of the second guide wires extends from the second segment to the transitional segment, in which the first and second guide wires are intertwisted with each other.

17 Claims, 9 Drawing Sheets (58) Field of Classification Search
CPC ..... H01L 21/4889; H01L 24/42; H01L 24/43;
H01L 24/44; H01L 24/45; H01L 24/46;
H01L 2224/49111; G02B 6/449; G02B
6/4465; H01R 24/00; H01R 2201/00;
H01R 3/00; H01R 4/00; H01R 9/00;
H01R 25/00; H01B 11/02; H01B 9/024;
B65H 2701/362
USPC ............... 254/134.3 R, 134.3 CL, 134.3 PA
See application file for complete search history.

(56) References Cited

U.S. PATENT DOCUMENTS

| | | | | |
|---|---|---|---|---|
| 6,185,859 B1* | 2/2001 | Pirkle | ............... | A01K 85/00 |
| | | | | 138/178 |
| 8,692,120 B2* | 4/2014 | Debladis | ............ | H01B 7/1825 |
| | | | | 174/128.2 |
| 2014/0374195 A1* | 12/2014 | Deconinck | ......... | D07B 1/0666 |
| | | | | 187/254 |

OTHER PUBLICATIONS

Jakie Erickson-Schweitzer, Joining Yarn by Spitting Plies and Re-twisting, 1998. (hrrp://www.heartstringsfiberarts.com/joining-yarn.shtm) (Year: 1998).*
See foreign translation attached (Year: 1982).*
Erickson-Schweitzer ("Joining Yarn by Splitting Plies and Re-twisting: How to splice yarn ends for an invisible join" (www.heartstringsfiberarts.com/joining-yarn.shtm)) (Year: 1998).*

* cited by examiner

WIRE PULLER AND CORD

BACKGROUND OF THE INVENTION

1. Field of the Invention

The present invention relates generally to wire pullers and cords which can be used to pass through pipes or other narrow passages.

2. Description of the Related Art

Wire pullers can be used to draw a long cable or the like through pipes or other narrow passages in a building. In the case of passing through a long narrow passages, e.g. with a length more than 30 meters, the wire pullers need to be provided with sufficient compressive strength and tensile strength to bear the friction from the pipes and other resistances. In addition, the distal ends of the wire pullers also need to remain flexible. Therefore, it is required to provide different physical properties to different segments of the wire pullers. For instance, the segment close to the distal end can be provided with smaller outer diameter to remain flexible, while the segment remote from the distal end can be provided with larger outer diameter to have better structural strength.

For this purpose, the Taiwanese invention patent no. TW 483208 discloses a wire puller and it shows the flexibility of the distal end of the wire puller can be enhanced by varying the pitch of the threads or by varying the elongation of the distal end thereof during the elongation process. Thereby, different segments of the wire puller can have different physical properties.

Nevertheless, it requires higher processing skills to implement the above-mentioned process in extrusion molding treatment of the resin wire pullers. It is so because the processing parameters in a part of the segments of the wire puller are different from those in the other part thereof, and yet these segments need to be extruded continually. As a result, such extrusion molding treatment usually leads to lower yield and higher cost.

SUMMARY OF THE INVENTION

The present invention to provide a wire puller and a cord.

According to some embodiments, the wire puller has a first guide wire section, a wire holder and a second guide wire section. The first guide wire section includes a plurality of first guide wires, and the first guide wire section has a first segment in which the first guide wires are intertwisted with each other. At least a part of the first guide wires extends from the first segment to a transitional segment. The wire holder is disposed on an end of the first guide wire section opposite to the transitional segment. The second guide wire section includes a plurality of second guide wires, and the second wire section has a second segment in which the second guide wires are intertwisted with each other. At least a part of the second guide wires extends from the second segment to the transitional segment in which the first and second guide wires are intertwisted with each other.

The wire puller may also include a second wire holder disposed on an end of the second guide wire section opposite to the transitional segment.

According to some embodiments, the cord includes a first guide wire section and a second guide wire section. The first guide wire section includes a plurality of first guide wires, and the first guide wire section has a first segment in which the first guide wires are intertwisted with each other. At least a part of the first guide wires extends from the first segment to a transitional segment. The second guide wire section includes a plurality of second guide wires. The second guide wire section has a second segment in which the second guide wires are intertwisted with each other. At least a part of the second guide wires extends from the second segment to the transitional segment in which the first and second guide wires are intertwisted with each other.

In the aforesaid wire puller and the cord, there are "n" strips of the first guide wires in the first guide wire section, and there are also "n" strips of the second guide wires in the second guide wire section. There are "a" strips of the first guide wires among all the first guide wires extending from the first segment to the transitional segment, and there are "b" strips of the second guide wires among all the second guide wires extending from the second segment to the transitional segment, in which a, b and n are positive integers, and n is a sum of a and b.

Based on the above-mentioned design, the manufacturer can choose suitable first and second guide wire sections subject to the desired properties. In the circumstance that the first and second guide wire sections are made of plastic, the first and second guide wire sections can be extruded separately and then partially intertwisted with each other. Such process requires lower processing skills and can therefore lead to higher yield and lower cost.

The following detailed description will further explain the full scope of applications for the present invention. However, it should be understood that the detailed description and specific examples, while indicating preferred embodiments of the invention, are given by way of illustration only, since various changes and modifications within the spirit and scope of the invention will become apparent to those with the proper technical knowledge from this detailed description.

BRIEF DESCRIPTION OF THE DRAWINGS

The present invention can be understood more fully by referring to the detailed description below, as well as the accompanying drawings. However, it must be understood that both the descriptions and drawings are given by way of illustration only, and thus do not limit the present invention.

DETAILED DESCRIPTION OF THE INVENTION

Figure 1:
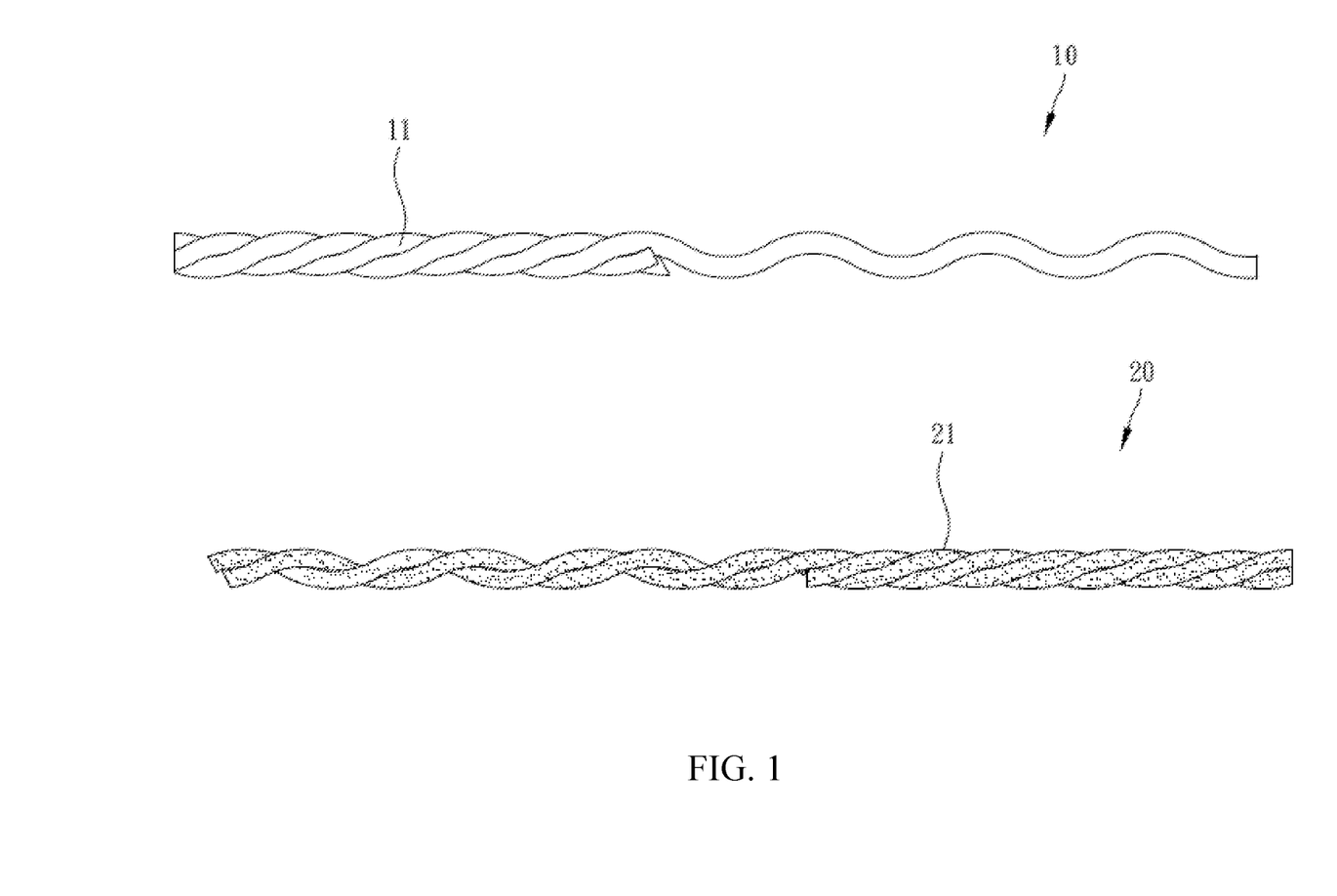
FIG. 1 is an explosive drawing in side view of a cord in accordance with the first embodiment of the present invention.
Figure 2:
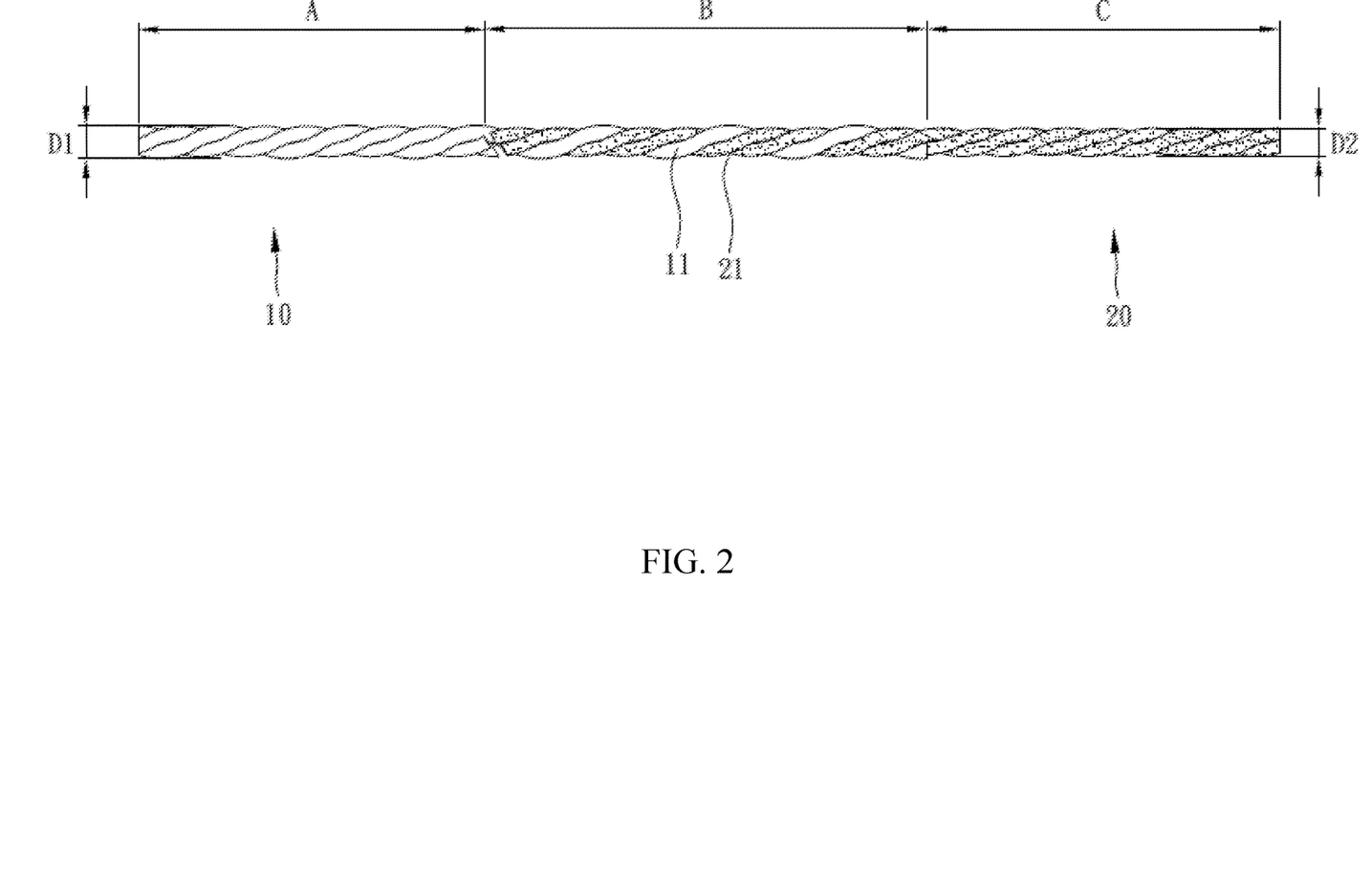
FIG. 2 is a side view of the cord in accordance with the first embodiment of the present invention.

Please refer to FIGS. 1 and 2 for the cord in accordance with the first embodiment of the present invention. The cord has a first guide wire section 10 and a second guide wire section 20.

The first guide wire section 10 includes three strips of first guide wires 11 and has a first segment A, in which these three first guide wires 11 are intertwisted with each other. One of the first guide wires 11 extends from the first segment A to a transitional segment B, but the other two first guide wires 11 do not extend to the transitional segment B.

The second guide wire section 20 includes three strips of second guide wires 21 and has a second segment C, in which these three second guide wires 21 are intertwisted with each other. Two of the second guide wires 21 extend from the second segment C to the transitional segment B, while the other second guide wire 21 do not extend thereto.

Thus, both the first and second guide wire sections are composed of three strips of guide wires, respectively, and there are also three strips of guide wires extending to the transitional segment. Because the first and second guide wires are intertwisted with each other in the transitional segment, the friction between these wires and the axially overlapping structure make them remain better axial compressive strength and tensile strength in the transitional segment.

The first and second guide wires can be made of resin, which can be but not limited to polyesters, polyolefins such as polypropylene and polyethylene, polyamides and copolymers thereof. Generally, the first and second guide wires have good compressive and tensile strengths and can be radially bent. Preferably, the guide wires can be resilient so as to return to their original shape after they are released from bending force. In possible embodiments, each of the guide wires can be composed of multiple intertwisting thin fibers.

To meet different needs, the materials, lengths, pitches, thicknesses, guide wire amounts, flexibilities and other properties of the first and second guide wire sections need not to be entirely the same. For example, the outer diameter D1 of the first guide wire section 10 is different from the outer diameter D2 of the second guide wire section 20.

Figure 3:
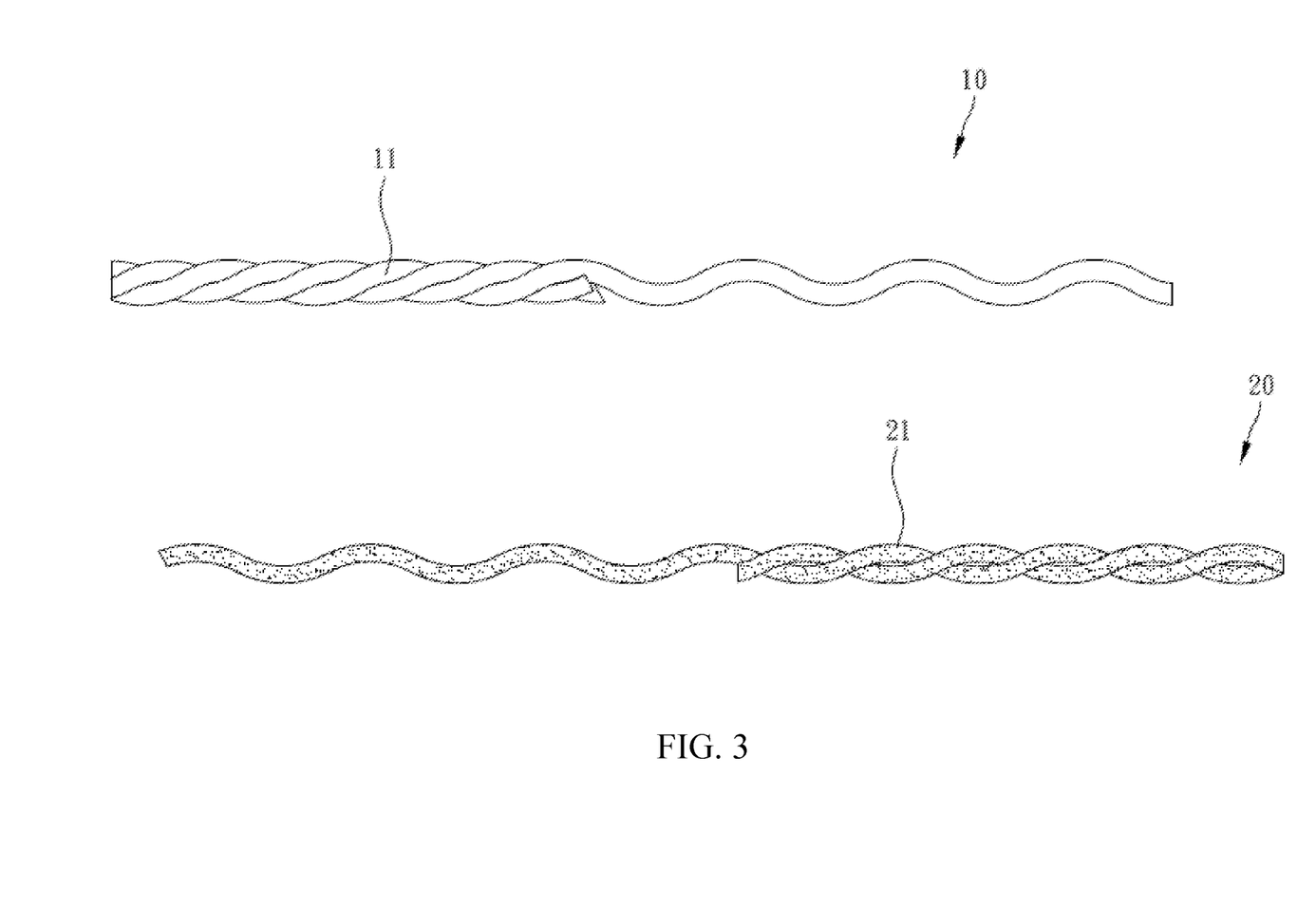
FIG. 3 is an explosive drawing in side view of a cord in accordance with the second embodiment of the present invention.
Figure 4:
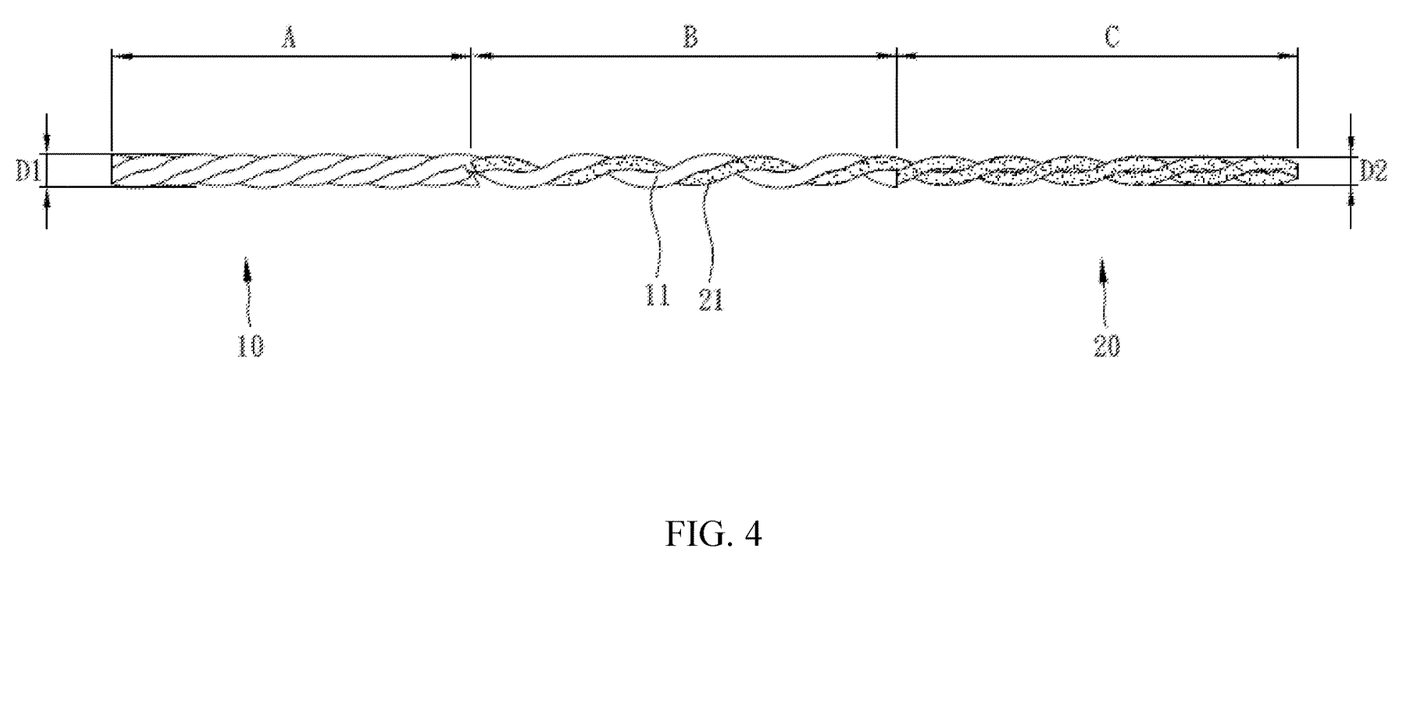
FIG. 4 is a side view of the cord in accordance with the second embodiment of the present invention.

Please refer to FIGS. 3 and 4 for a cord in accordance with the second embodiment of the present invention. The cord also has a first guide wire section 10 and a second guide wire section 20. The second embodiment is different from the first embodiment in that the second guide wire section 20 includes only two second guide wires 21, and only one of the second guide wires 21 extends to the transitional segment B. And thus the transitional segment B is composed of one first guide wire 11 and one second guide wire 21 intertwisting with the first guide wire 11. As such, the properties of the transitional segment B can be varied by adjusting the amount of the guide wires extending thereto and are therefore different from the first embodiment. Likewise, the first and second guide wire sections 10, 20 are different in their outer diameters D1, D2 and the amounts of the guide wires, and therefore the physical properties such as flexibilities and hardnesses thereof are also different.

In the afore-mentioned embodiments, both the first and second guide wire sections have only a part of their guide wires extending to the transitional segment. In other possible embodiments, all the first guide wires can be extended to the transitional segment and intertwisted with the second guide wires. In other possible embodiments, all the second guide wires can be extended to the transitional segment and intertwisted with the first guide wires.

Figure 5:
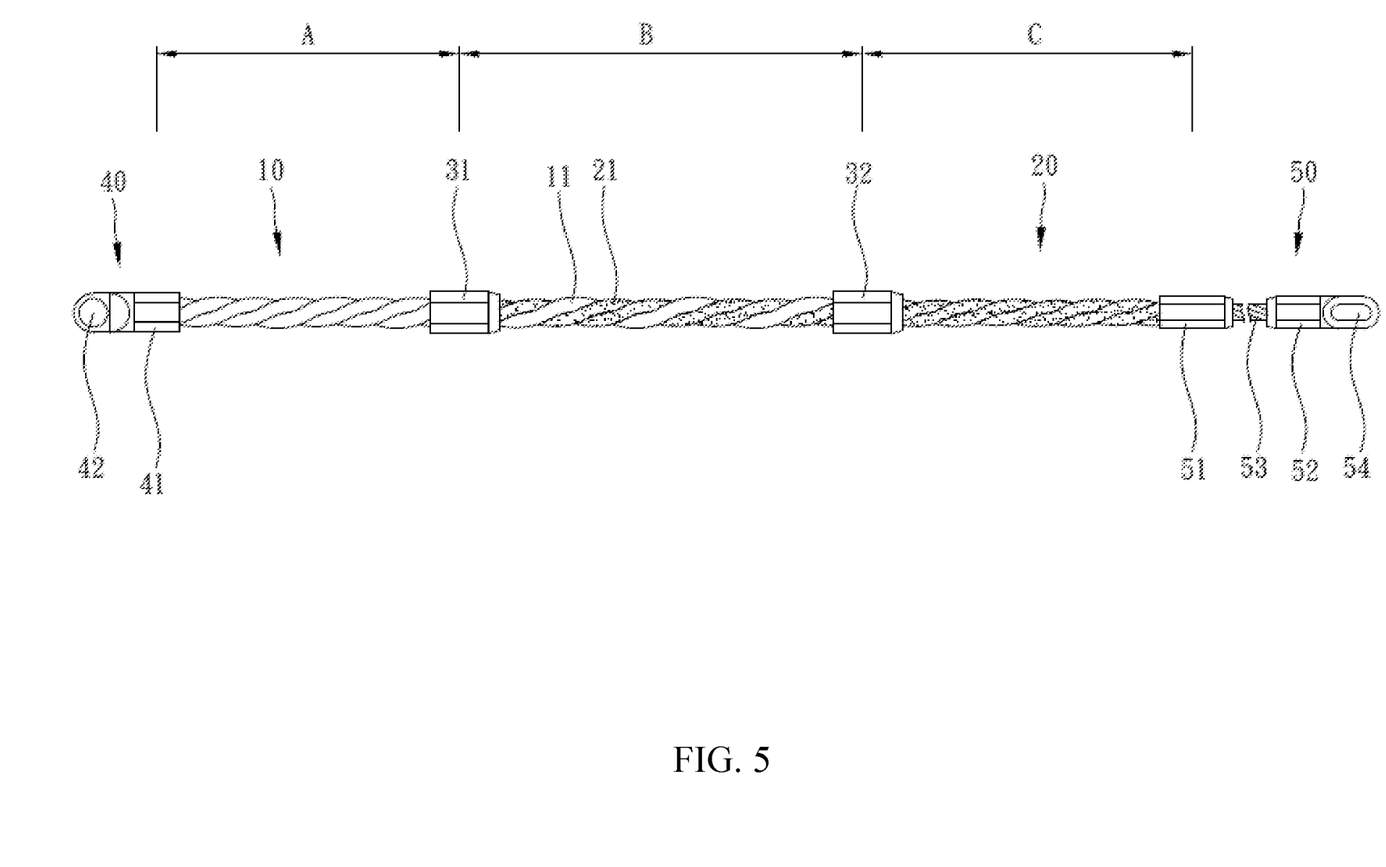
FIG. 5 is a side view of a wire puller in accordance with the preferred embodiment of the present invention.
Figure 6:
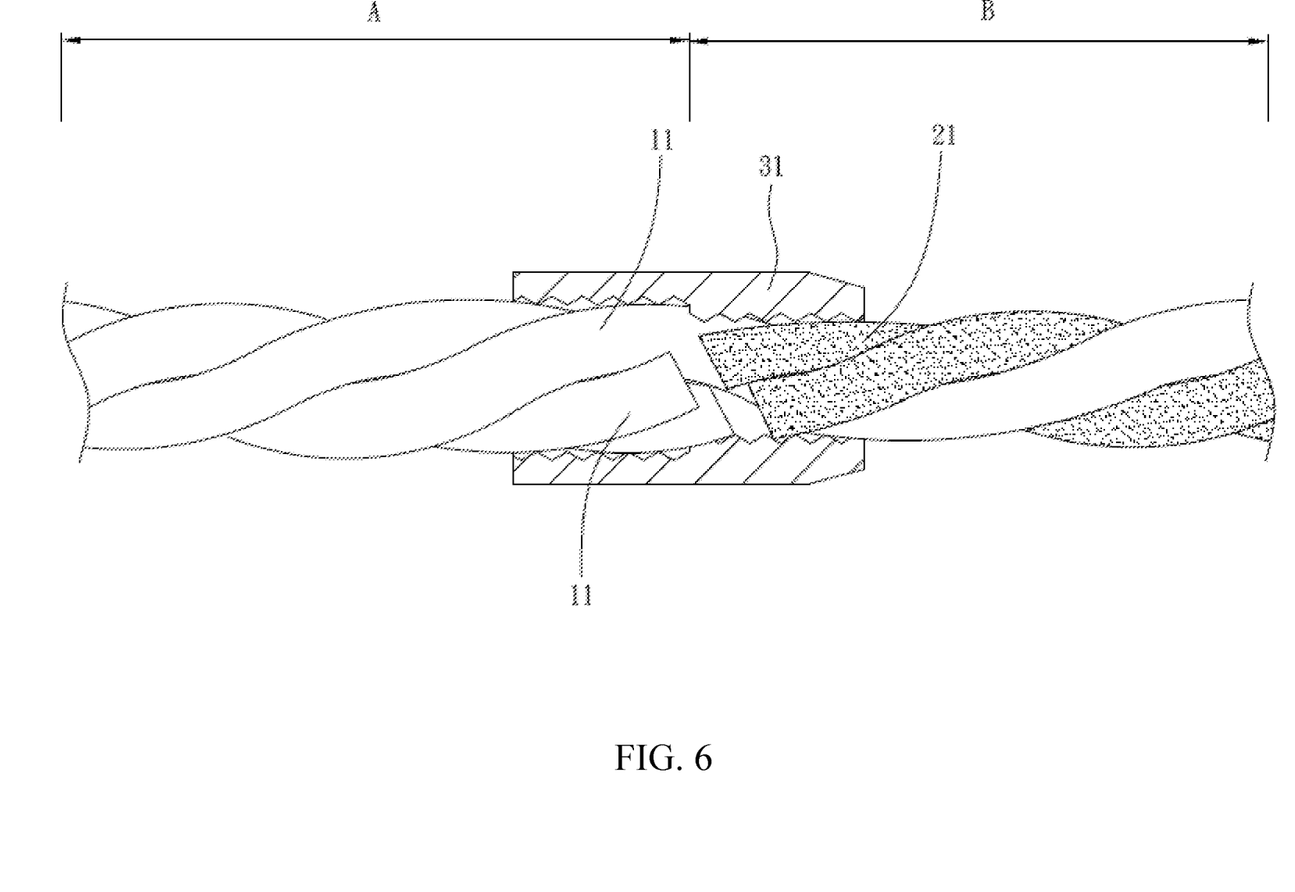
FIG. 6 is an enlarged side view showing part of the wire puller in accordance with the preferred embodiment of the present invention, in which the positioning sleeve is shown in profile.

Please refer to FIG. 5 for a wire puller in accordance with the preferred embodiment of the present invention. The middle section of the wire puller is a cord similar to that of the afore-mentioned first embodiment. That is, the cord includes a first guide wire section 10 and a second guide wire section 20. The cord further includes a positioning means for fastening the first and second guide wires 11, 21 in the transitional segment in a manner that the first and second guide wires 11, 21 cannot spirally rotate about each other. In the present embodiment, the positioning means includes a first positioning sleeve 31 and a second positioning sleeve 32. The first positioning sleeve 31 is engaged at an intersection between the first segment A and the transitional segment B. The second positioning sleeve 32 is engaged at an intersection between the second segment C and the transitional segment B. As shown in FIG. 6, the inner periphery of the first positioning sleeve 31 is formed with friction patterns to increase the engagement force. One section of the first positioning sleeve 31 is engaged with the first guide wires 11 in the first segment A, and the other section of the first positioning sleeve 31 is engaged with the first and second guide wires 11, 21 in the transitional segment B. These two sections of the first positioning sleeve 31 have different inner diameters in order to accommodate first segment A and the transitional segment B having different outer diameters. The second positioning sleeve 32 has a structure similar to the first positioning sleeve 31.

In other possible embodiments, the positioning means can be provided with only one positioning sleeve, which can be placed at one of the ends of the transitional segment or at a position between the two ends of the transitional segment. The positioning means can also be a forced-tight device which may includes a tapered ring and a tapered nut engaged with the tapered ring so as to fasten the first and second guide wires in a forced-tight manner. Other possible positioning means includes but not limited to coating adhesives on the transitional segment, tape winding and tacking. Or, the first and second guide wires in the transitional segment can be formed with complementary patterns such as teeth and notches, such that when the first and second guide wires are intertwisted, the teeth also match and engage with the notches.

Figure 7:
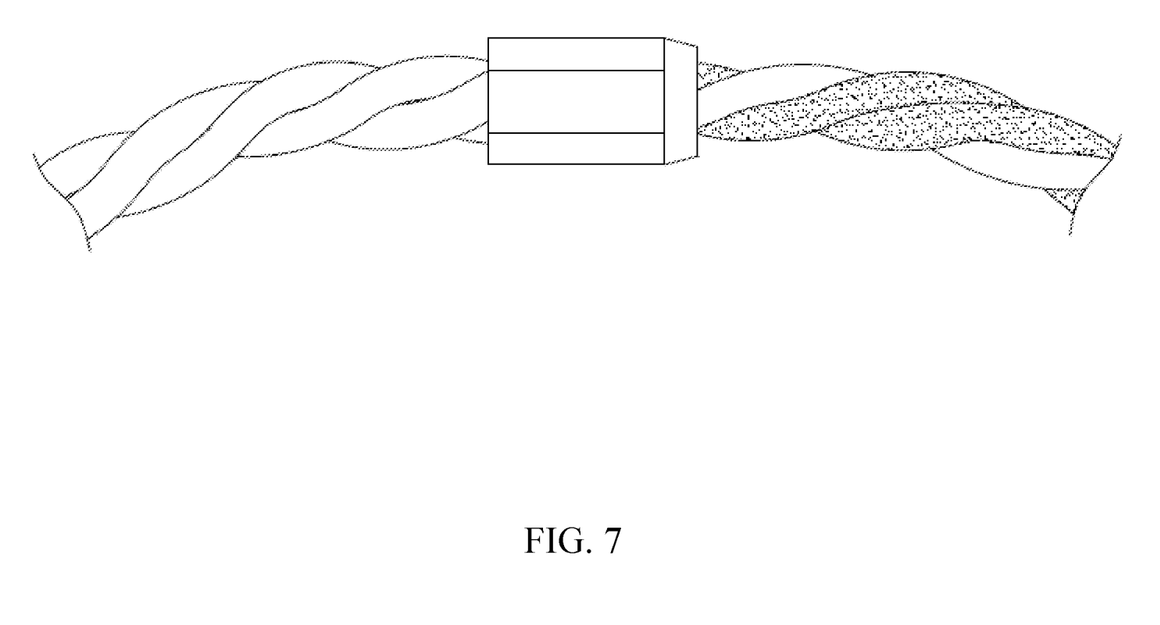
FIG. 7 is an enlarged side view showing part of the wire puller in accordance with the preferred embodiment of the present invention, in which the cord is bent.

In the present embodiment, two positioning sleeves are provided to engage two ends of the transitional segment respectively. These two positioning sleeves can both provide engaging force to fasten the first and second guide wires, and therefore the length of the individual positioning sleeve can be shortened. Such fact can lead to an advantage in the fact that the guide wires adjacent to the shortened positioning sleeve can remain better flexibility when the cord is bent as shown in FIG. 7. The longer the positioning sleeve is, the less flexible the guide wires adjacent to the positioning sleeve are. It is noticed that the more the positioning sleeves are disposed on the transitional segment, the shorter the individual positioning sleeve can be made, which can make the first and second guide wires not only tight but also flexible.

To pull a wire, the wire puller is further provided with a first wire holder 40 and a second wire holder 50. The first wire holder 40 is disposed on an end of the first segment A opposite to the transitional segment B. The second wire holder 50 is disposed on an end of the second segment C opposite to the transitional segment B. The first and second wire holders 40, 50 can have the same or similar shapes. In the present embodiment, the first wire holder 40 has a jacket 41 mount on the end of the first segment A, and an eye 42 formed on the jacket 41 to connect the wire. The second wire holder 50 has a jacket 51 mount on the end of the second segment C, another jacket 52, a cord 53 disposed between the jackets 51, 52 such as a steel cable, and an eye 54 formed on the jacket 52. Compared with the first wire holder 40, the second wire holder 50 is more superior in its flexibility. In other possible embodiments, the wire puller can be provided with only one wire holder.

It is noticed that, in some embodiments, the cord of the present invention can be applied not only to the above-mentioned wire pullers, but also to other fields including but not limiting to the circumstance of cleaning or detecting objects in narrow passages. Under such circumstances, the wire holder is not necessary and therefore can be omitted. In addition, some embodiments of the cord of the present invention can also be provided with more than two guide wire sections. In possible embodiments, a cord can have three guide wire sections, at least two of which are provided with the transitional segment as above mentioned.

Figure 8:
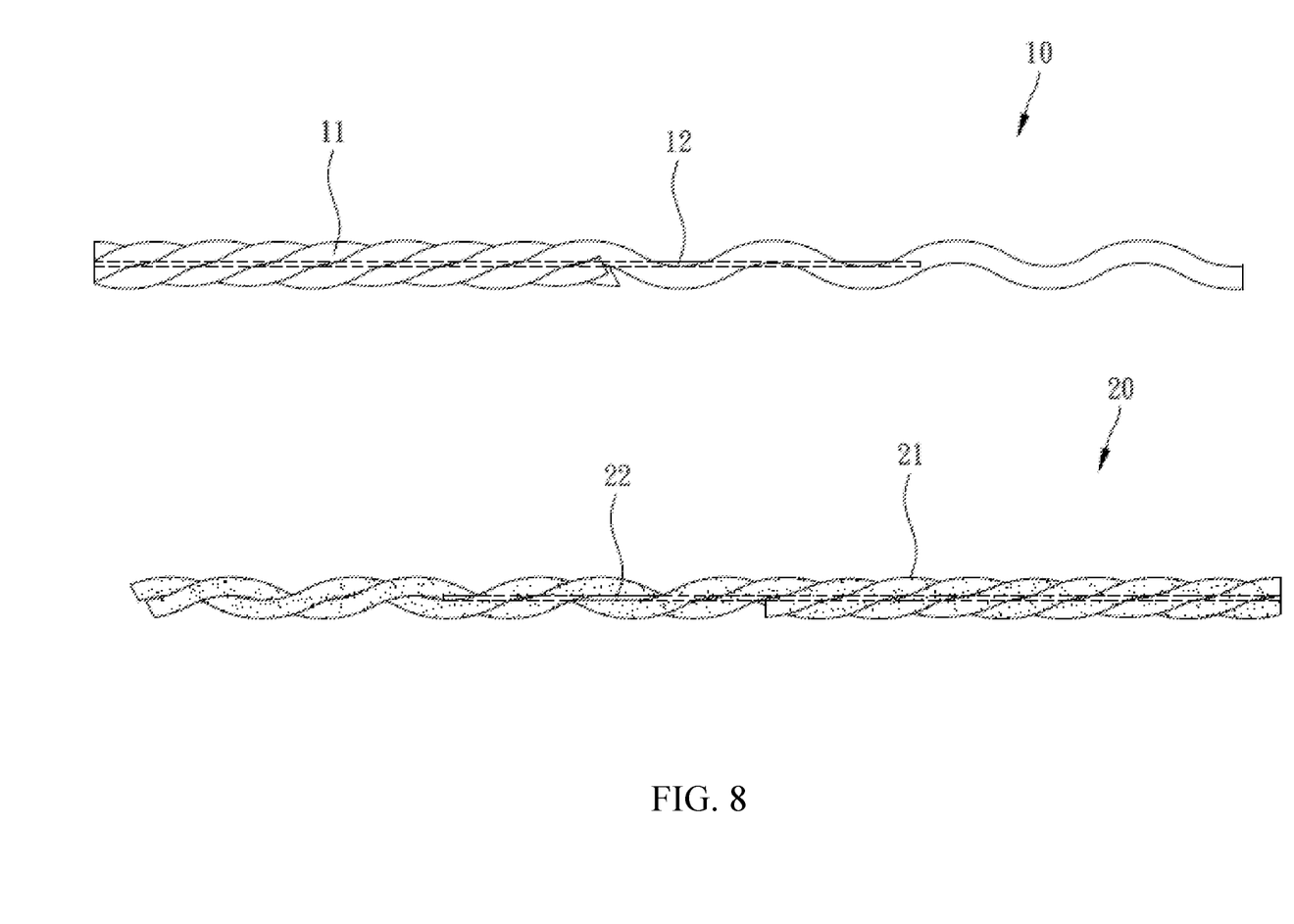
FIG. 8 is an explosive drawing in side view of a cord in accordance with the third embodiment of the present invention.
Figure 9:
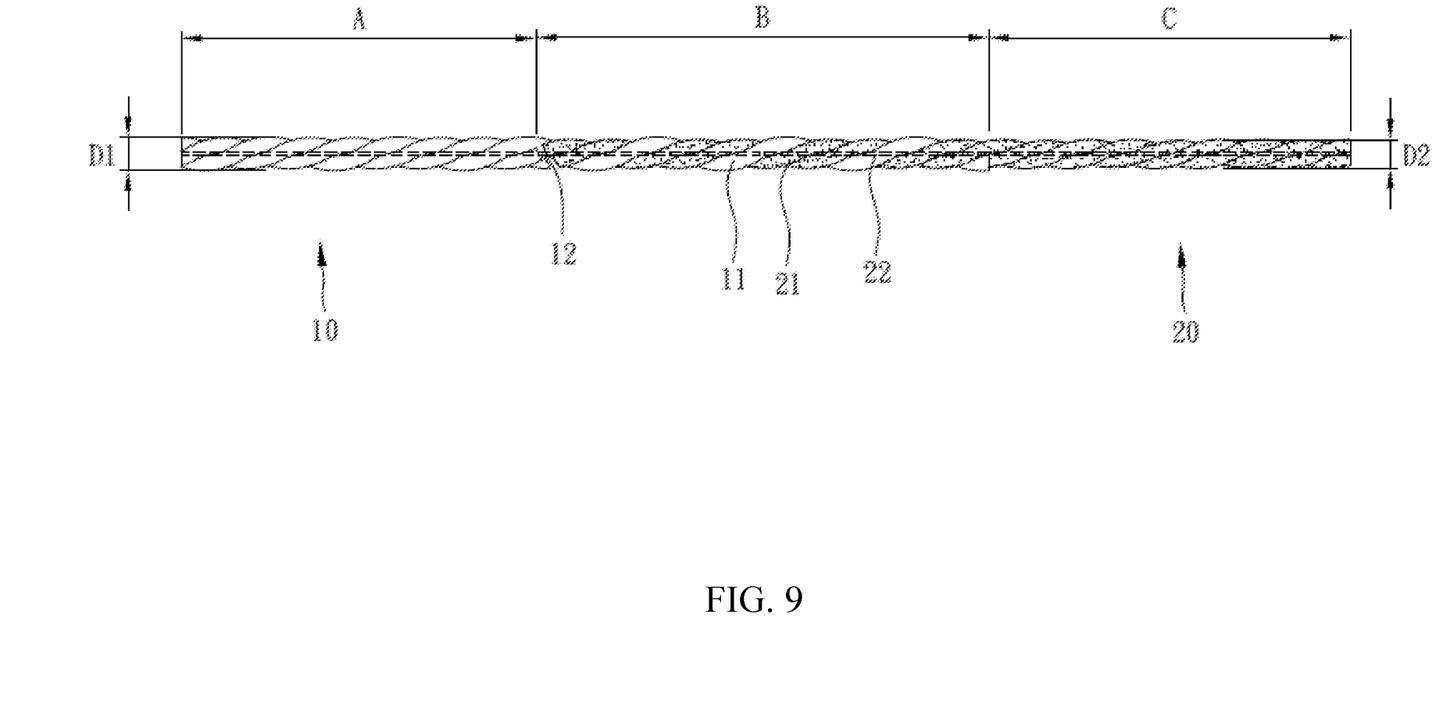
FIG. 9 is a side view of the cord in accordance with the third embodiment of the present invention.

Please refer to FIGS. 8 and 9 for a cord in accordance with the third embodiment of the present invention. The first guide wire section 10 further includes a first axial wire 12 extending along a central line thereof. The second guide wire section 20 further includes a second axial wire 22 extending along a central line thereof. The first guide wires 11 are not only intertwisted with each other in the first segment A, but also spirally wound about the first axial wire 12. In other words, the first axial wire 12 is the geometric center of the first guide wires 11. Likewise, the second guide wires 21 are not only intertwisted with each other in the second segment C, but also spirally wound about the second axial wire 22. Preferably, at least one of the first and second axial wires 12, 22 extends into the transitional segment B. For instance, both the first and second axial wires 12, 22 extend into the transitional segment B in the present embodiment, and the first and second guide wires 11, 21 in the transitional segment B are further wound about the first and second axial wires 12, 22. In other possible embodiments, the first and second axial wires do not extend into the transitional segment, and thus the first and second guide wires are only intertwisted with each other. The first and second axial wires can be made of resin including but not limiting to polyesters, polyolefins such as PP and PE, polyamides and copolymers thereof. Or, the first and second axial wires can also be made of other materials such as steel or fiber glass.

Based on the above-mentioned design, the manufacturer can choose suitable first and second guide wire sections subject to the desired properties. In the circumstance that the first and second guide wire sections are made of plastic, the first and second guide wire sections can be extruded separately and then partially intertwisted with each other. Such process requires lower processing skills and can therefore lead to higher yield and lower cost.

The invention described above is capable of many modifications, and may vary. Any such variations are not to be regarded as departures from the spirit of the scope of the invention, and all modifications which would be obvious to someone with the technical knowledge are intended to be included within the scope of the following claims.

What is claimed is:

1. A wire puller, comprising:
a first guide wire section, comprising a plurality of first guide wires, the first guide wire section having a first segment in which the plurality of first guide wires are intertwisted with each other, at least a part of the plurality of first guide wires extending from the first segment to a transitional segment;
a wire holder, disposed on an end of the first guide wire section opposite to the transitional segment,
a second guide wire section, comprising a plurality of second guide wires, the second guide wire section having a second segment in which the plurality of second guide wires are intertwisted with each other, at least a part of the plurality of second guide wires extending from the second segment to the transitional segment in which the part of the plurality of first guide wires and the part of the plurality of second guide wires are intertwisted with each other;
a first positioning sleeve engaged at an intersection between the first segment and the transitional segment; and
a second positioning sleeve engaged at an intersection between the second segment and the transitional segment,
wherein
the first segment has a first length extending from an end of the first segment opposite a point at which the part of the plurality of first guide wires extend from the first segment to the transitional segment,
the second segment has a second length extending from an end of the second segment opposite a point at which the part of the plurality of second guide wires extend from the second segment to the transitional segment,
the first segment has a first outer diameter that is constant across the first length of the first segment,
the second segment has a second outer diameter that is constant across the second length of the second segment, and
the second outer diameter is different from the first outer diameter.

2. The wire puller of claim 1, wherein there are "n" strips of the plurality of first guide wires in the first guide wire section, there are also "n" strips of the plurality of second guide wires in the second guide wire section, there are "a" strips of the plurality of first guide wires among all the plurality of first guide wires extending from the first segment to the transitional segment, and there are "b" strips of the plurality of second guide wires among all the plurality of second guide wires extending from the second segment to the transitional segment, in which a, b and n are positive integers, and n is a sum of a and b.

3. A cord, comprising:
a first guide wire section, comprising a plurality of first guide wires, the first guide wire section having a first segment in which the plurality of first guide wires are intertwisted with each other, at least a part of the plurality of first guide wires extending from the first segment to a transitional segment;
a second guide wire section, comprising a plurality of second guide wires, the second guide wire section having a second segment in which the plurality of second guide wires are intertwisted with each other, at least a part of the plurality of second guide wires extending from the second segment to the transitional segment in which the part of the plurality of first guide wires and the part of the plurality of second guide wires are intertwisted with each other;
a first positioning sleeve engaged at an intersection between the first segment and the transitional segment; and a second positioning sleeve engaged at an intersection between the second segment and the transitional segment, wherein the first segment has a first length extending from an end of the first segment opposite a point at which the part of the plurality of first guide wires extend from the first segment to the transitional segment, the second segment has a second length extending from an end of the second segment opposite a point at which the part of the plurality of second guide wires extend from the second segment to the transitional segment, the first segment has a first outer diameter that is constant across the first length of the first segment, the second segment has a second outer diameter that is constant across the second length of the second segment, and the second outer diameter is different from the first outer diameter.

4. The cord of claim 3, wherein there are "n" strips of the plurality of first guide wires in the first guide wire section, there are also "n" strips of the plurality of second guide wires in the second guide wire section, there are "a" strips of the plurality of first guide wires among all the plurality of first guide wires extending from the first segment to the transitional segment, and there are "b" strips of the plurality of second guide wires among all the plurality of second guide wires extending from the second segment to the transitional segment, in which a, b and n are positive integers, and n is a sum of a and b.

5. The cord of claim 3, wherein the first guide wire section further comprises a first axial wire, and the plurality of first guide wires are spirally wound about the first axial wire in the first segment.

6. The cord of claim 3, wherein the first guide wire section further comprises a first axial wire, the plurality of first guide wires are spirally wound about the first axial wire in the first segment, the second guide wire section further comprises a second axial wire, the plurality of second guide wires are spirally wound about the second axial wire in the second segment, at least one of the first and second axial wires extends into the transitional segment, and the part of the first guide wires extending from the first segment to the transitional segment and the part of the second guide wires extending from the second segment to the transitional segment are spirally wound about the first axial wire and the second axial wire extending into the transitional segment.

7. The wire puller of claim 1, wherein a first section of the first positioning sleeve is engaged with a first portion of the first segment, a second section of the first positioning sleeve is engaged with a first portion of the transitional segment, a first section of the second positioning sleeve is engaged with a first portion of the second segment, and a second section of the second positioning sleeve is engaged with a second portion of the transitional segment.

8. The wire puller of claim 7, wherein an inner periphery of the first positioning sleeve has friction patterns that increase an engagement force between the first positioning sleeve, the first segment and the transitional segment, a inner periphery of the second positioning sleeve has friction patterns that increase an engagement force between the second positioning sleeve, the second segment and the transitional segment, and the friction patterns of the first positioning sleeve and the second positioning sleeve comprise a plurality of circumferential ridges.

9. The wire puller of claim 8, wherein an inner diameter of the first section of the first positioning sleeve is engaged with the first segment, an inner diameter of the second section of the first positioning sleeve is engaged with the transitional segment, an inner diameter of the first section of the second positioning sleeve is engaged with the second segment, and an inner diameter of the second section of the second positioning sleeve is engaged with the transitional segment.

10. The wire puller of claim 9, wherein the part of the plurality of first guide wires extending from the first segment to the transitional segment and the part of the plurality of second guide wires extending from the second segment to the transitional segment have teeth and notches, and the part of the plurality of first guide wires and the part of the plurality of second guide wires are intertwisted with each other such that the teeth and notches of each of the part of the plurality of first guide wires extending from the first segment to the transitional segment and the part of the plurality of second guide wires extending from the first segment to the transitional segment are engaged with each other.

11. The wire puller of claim 9, wherein an outer surface of each of the plurality of intertwisted first guide wires is in continuous contact along an axial direction with an outer surface of another first guide wire of the plurality of intertwisted first guide wires, and an outer surface of each of the plurality of intertwisted second guide wires is in continuous contact along an axial direction with an outer surface of another second guide wire of the plurality of intertwisted second guide wires.

12. The cord of claim 3, wherein a first section of the first positioning sleeve is engaged with a first portion of the first segment, a second section of the first positioning sleeve is engaged with a first portion of the transitional segment, a first section of the second positioning sleeve is engaged with a first portion of the second segment, and a second section of the second positioning sleeve is engaged with a second portion of the transitional segment.

13. The cord of claim 12, wherein an inner periphery of the first positioning sleeve has friction patterns that increase an engagement force between the first positioning sleeve, the first segment and the transitional segment, a inner periphery of the second positioning sleeve has friction patterns that increase an engagement force between the second positioning sleeve, the second segment and the transitional segment, and the friction patterns of the first positioning sleeve and the second positioning sleeve comprise a plurality of circumferential ridges.

14. The cord of claim 13, wherein an inner diameter of the first section of the first positioning sleeve is engaged with the first segment, an inner diameter of the second section of the first positioning sleeve is engaged with the transitional segment, an inner diameter of the first section of the second positioning sleeve is engaged with the second segment, and an inner diameter of the second section of the second positioning sleeve is engaged with the transitional segment.

15. The cord of claim 14, wherein the part of the plurality of first guide wires extending from the first segment to the transitional segment and the part of the plurality of second guide wires extending from the second segment to the transitional segment have teeth and notches, and the part of the plurality of first guide wires and the part of the plurality of second guide wires are intertwisted with each other such that the teeth and notches of each of the part of the plurality of first guide wires extending from the first segment to the transitional segment and the part of the plurality of second guide wires extending from the first segment to the transitional segment are engaged with each other.

16. The cord of claim 14, wherein the first guide wires of the plurality of first guide wires and the second guide wires of the plurality of second guide wires comprise one or more of a polyester, a polyolefin, or a polyamide.

17. The cord of claim 14, wherein an outer surface of each of the plurality of intertwisted first guide wires is in continuous contact along an axial direction with an outer surface of another first guide wire of the plurality of intertwisted first guide wires, and an outer surface of each of the plurality of intertwisted second guide wires is in continuous contact along an axial direction with an outer surface of another second guide wire of the plurality of intertwisted second guide wires.

\* \* \* \* \*